United States Patent
Takimoto et al.

(10) Patent No.: US 8,366,324 B2
(45) Date of Patent: Feb. 5, 2013

(54) SEALING DEVICE AND ROLLING BEARING APPARATUS

(75) Inventors: Masao Takimoto, Kashiwara (JP); Changxin Yu, Ageo (JP); Katsuyuki Harada, Yamatokoriyama (JP); Yoshito Takada, Nara (JP)

(73) Assignee: JTEKT Corporation, Osaka-Shi, Osaka (JP)

( * ) Notice: Subject to any disclaimer, the term of this patent is extended or adjusted under 35 U.S.C. 154(b) by 423 days.

(21) Appl. No.: 12/312,460

(22) PCT Filed: Nov. 12, 2007

(86) PCT No.: PCT/JP2007/071898
§ 371 (c)(1), (2), (4) Date: May 12, 2009

(87) PCT Pub. No.: WO2008/062684
PCT Pub. Date: May 29, 2008

(65) Prior Publication Data
US 2010/0046873 A1    Feb. 25, 2010

(30) Foreign Application Priority Data
Nov. 22, 2006    (JP) .................................. 2006-315373

(51) Int. Cl.
*F16C 33/76*    (2006.01)
*F16J 15/34*    (2006.01)

(52) U.S. Cl. ........................................ 384/484; 277/353

(58) Field of Classification Search ................. 384/478, 384/481, 482, 484–486, 607; 277/353, 433, 277/468, 562, 566, 571, 576, 925
See application file for complete search history.

(56) References Cited

U.S. PATENT DOCUMENTS

| 4,434,985 A | 3/1984 | Sonnerat |
| 4,799,808 A * | 1/1989 | Otto ............................. 277/349 |
| 5,129,744 A * | 7/1992 | Otto et al. ..................... 384/486 |

(Continued)

FOREIGN PATENT DOCUMENTS

| DE | 195 04 315 A1 | 8/1995 |
| DE | 199 38 246 C1 | 4/2001 |

(Continued)

OTHER PUBLICATIONS

European Search Report dated Apr. 19, 2011.

(Continued)

*Primary Examiner* — James Pilkington
(74) *Attorney, Agent, or Firm* — McGinn IP Law Group, PLLC

(57) ABSTRACT

A sealing device is mounted in an annular space defined between an inner member and an outer member which rotate relative to each other. The sealing device includes a slinger which has a cylindrical portion which is press fitted on or in one of the inner member and the outer member and an annular plate portion, and a seal main body which has a core metal having a cylindrical portion which is press fitted in or on the other of the inner member and the outer member and an annular plate portion and a seal member fixed to the core metal. A lip for closing a space between the annular plate portion of the slinger and the cylindrical portion of the core metal is provided on the slinger or the seal main body.

11 Claims, 4 Drawing Sheets

U.S. PATENT DOCUMENTS

| | | | |
|---|---|---|---|
| 5,476,272 A * | 12/1995 | Hixson, II | 384/448 |
| 6,550,973 B2 * | 4/2003 | Yeo | 384/484 |
| 7,056,028 B2 * | 6/2006 | Hosoda et al. | 384/486 |
| 7,455,459 B2 * | 11/2008 | Toth et al. | 384/448 |
| 2007/0081751 A1 * | 4/2007 | Norimatsu et al. | 384/486 |
| 2007/0090604 A1 | 4/2007 | Shibayama et al. | |

FOREIGN PATENT DOCUMENTS

| | | |
|---|---|---|
| EP | 0 065 887 | 12/1982 |
| EP | 1 650 480 A1 | 4/2006 |
| JP | 60-107243 | 7/1985 |
| JP | 2-93569 | 7/1990 |
| JP | A-H03-20762 | 2/1991 |
| JP | 4-14863 | 2/1992 |
| JP | 4-50724 | 4/1992 |
| JP | 5-3739 | 1/1993 |
| JP | 2000-081150 (A) | 3/2000 |
| JP | 2002-139057 | 5/2002 |
| JP | 2007-107674 | 4/2007 |

OTHER PUBLICATIONS

Microfilm of the specification and drawings annexed to the request of Japanese Utility Model Application No. 55694/1990 (Laid-open No. 14863/1992) (NOK Corp.), Feb. 6, 1992.

Microfilm of the specification and drawings annexed to the request of Japanese Utility Model Application No. 58473/1991 (Laid-open No. 3739/1993) (NOK Corp.), Jan. 22, 1993.

Notification of Reason for Refusal dated Oct. 23, 2012, with English translation.

* cited by examiner

US 8,366,324 B2

SEALING DEVICE AND ROLLING BEARING APPARATUS

TECHNICAL FIELD

The present invention relates to a sealing device for sealing an annular space between an inner member and an outer member which rotate relative to each other and a bearing apparatus.

BACKGROUND ART

Conventionally, as a sealing device for use in a rolling bearing apparatus (a hub unit) for a wheel, there is, for example, a sealing device that is mounted in an annular space defined between an inner member and an outer member which rotate relative to each other. This sealing device includes a slinger which is press fitted on the inner member and a seal main body which is press fitted in the outer member, and this seal main body is made up of a core metal which is press fitted in the outer member and a seal member which is fixed to the core metal and which has a main lip, an auxiliary lip and a side lip which contact closely and slidably the slinger (for example, JP-UA-4-50724).

DISCLOSURE OF THE INVENTION

Problem that the Invention is to Solve

In the sealing device, it was a problem that foreign matters such as muddy water intruded in the interior of the bearing. With a view to solving the problem, although an interference between the slide lip and an annular plate portion of the slinger or an interference between the main lip and a cylindrical portion of the slinger has been increased, since wear and deterioration with age occur in an elastic member (rubber) which makes up the lip, the intrusion of foreign matters into the interior of the bearing still has continued to occur.

The invention has been made in view of these situations, and an object thereof is to provide a sealing device which can prevent the intrusion of foreign matters from a space between a core metal and a slinger and a rolling bearing apparatus which includes the sealing device.

Means for Solving the Problem

A sealing device of the invention is a sealing device adapted to be mounted in an annular space defined between an inner member and an outer member which rotate relative to each other, characterized by comprising a slinger having a cylindrical portion which is press fitted on or in one of the inner member and the outer member and an annular plate portion which extends in a radial direction from the cylindrical portion, and a seal main body having a core metal which has a cylindrical portion which is press fitted in or on the other of the inner member and the outer member and an annular plate portion which extends in the radial direction from the cylindrical portion and a seal member fixed to the core metal, wherein a lip for closing a space between the annular plate portion of the slinger and the cylindrical portion of the core metal is provided on the slinger or the seal main body.

According to the sealing device of the invention, the intrusion of foreign matters such as muddy water into the interior of the sealing device can be prevented by closing the space between the annular plate portion of the slinger and the cylindrical portion of the core metal by the lip. By this, the intrusion of foreign matters into the interior of a bearing can be prevented.

In the sealing device, the lip is preferably provided integrally on the seal member of the seal main body. When a lip is formed on the seal main body, since the seal main body has already had the seal member, the lip may be provided integrally on the seal member. However, when a lip is formed on the slinger, an elastic member needs to be fixed to the slinger only for the purpose of providing the lip thereon. Because of this, the lip can be formed with smaller numbers of components and manufacturing steps than when providing the lip on the slinger.

In the sealing device, the seal member of the seal main body preferably has the lip and a side lip which contact closely and slidably an inner surface of the annular plate portion of the slinger, and a cylindrical member for preventing the separation of the slinger from the seal main body is preferably provided on an outer circumferential surface of the cylindrical portion of the slinger in a position lying further inwards towards an interior of a bearing than the seal main body.

In this case, although the slinger and the seal main body are made easy to be separated from each other by a force being applied to an outer side of the annular plate portion of the slinger due to the lip and the side lip being brought into contact with the inner surface of the annular plate portion of the slinger. However, the separation of the slinger from the seal main body can be prevented by fixing the cylindrical member to the outer circumferential surface of the cylindrical portion of the slinger in the position lying further inwards towards the interior of the bearing.

Further, in the sealing device, the lip may be provided on the slinger.

According to the invention, there is provided a rolling bearing apparatus comprising an inner ring and an outer ring which rotate relative to each other via rolling elements, and a sealing device adapted to be disposed in an annular space defined between the inner ring and the outer ring, the rolling bearing apparatus being characterized in that the sealing device comprises a slinger having a cylindrical portion which is press fitted on or in one of the inner ring and the outer ring and an annular plate portion which extends in a radial direction from the cylindrical portion, and a seal main body having a core metal which has a cylindrical portion which is press fitted in or on the other of the inner ring and the outer ring and an annular plate portion which extends in the radial direction from the cylindrical portion and a seal member fixed to the core metal, a lip for closing a space between the annular plate portion of the slinger and the cylindrical portion of the core metal being provided on the slinger or the seal main body.

Advantage of the Invention

According to the sealing device and the rolling bearing apparatus of the invention, the intrusion of foreign matters from the space between the core metal and the slinger can be prevented.

BEST MODE FOR CARRYING OUT THE INVENTION

Figure 1:
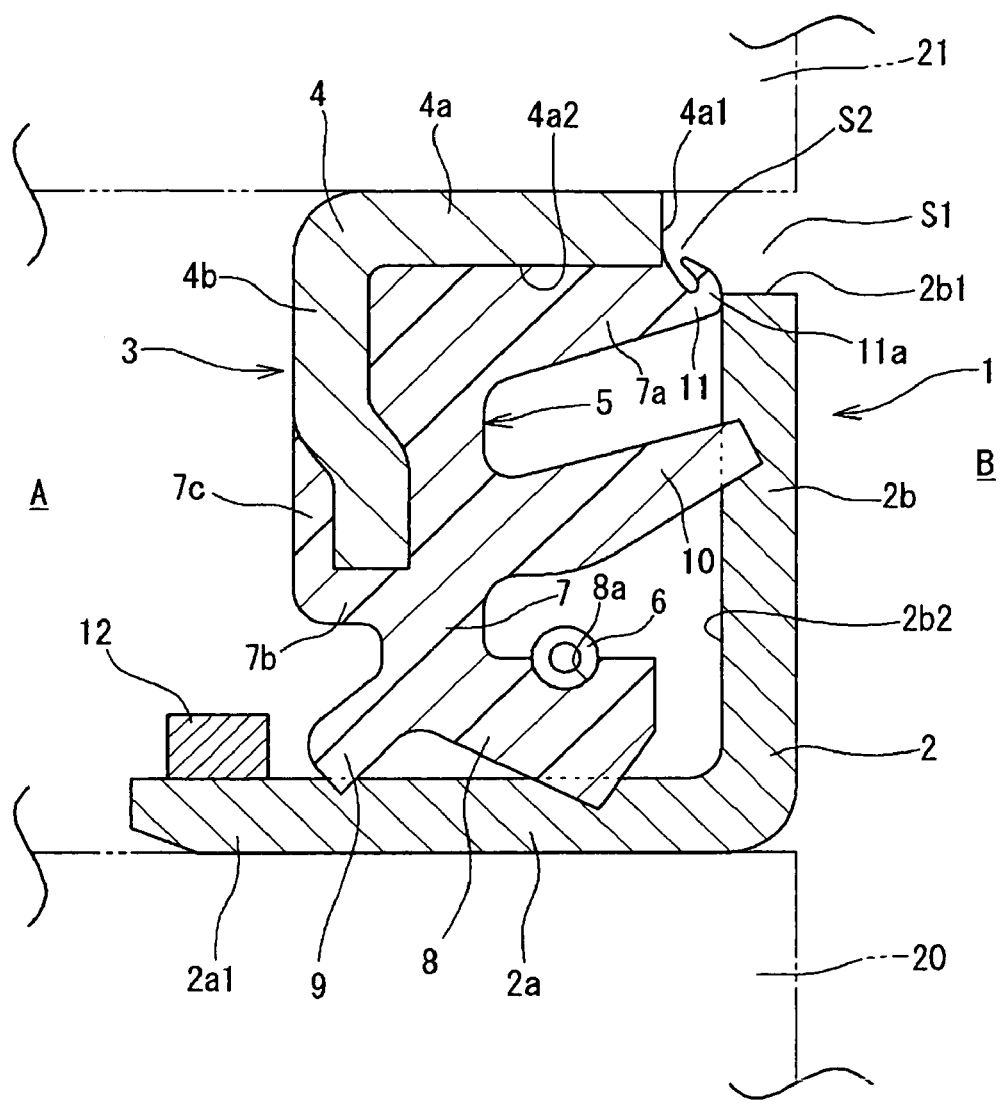
FIG. 1 is a explanatory sectional view showing a sealing device according to an embodiment of the invention.

FIG. 1 is an explanatory sectional view showing a sealing device according to an embodiment of the invention. This sealing device 1 is to be used in a rolling bearing apparatus 30 (a hub unit) to which a wheel of an automobile is attached and is mounted in an annular space between an inner member 20 which forms an inner ring of a bearing and an outer member 21 which forms an outer ring of the bearing, the inner member 20 and the outer member 21 being disposed concentrically with each other and rotatably relative to each other via rolling elements 31, whereby the leakage of a lubricant in an interior A of the bearing to an exterior side B is prevented and the intrusion of foreign matters such as muddy water into the interior A of the bearing from the exterior side B is prevented. Further, the sealing device 1 shown in FIG. 1 shows a free state before deformation which exists before its installation between the inner member 20 and the outer member 21.

This sealing device 1 includes a slinger 2 which is press fitted on the inner member 20 and a seal main body 3 which is press fitted in the outer member 21.

The slinger 2 is an annular member of a substantially L-shaped cross section which includes a cylindrical portion 2a which is press fitted on the inner member 20 and an annular plate portion 2b which is bent radially outwards from an exterior side B end portion of the cylindrical portion 2a.

The seal main body 3 is made up of an annular core metal 4 of a substantially L-shaped cross section, a seal member 5 which is fixed to the core metal 4, and an annular spring ring 6.

The core metal 4 is an annular member made of a metal (for example, SPCC) and is made up of a cylindrical portion 4a which is press fitted in the outer member 21 and an annular plate portion 4b which is bent radially inwards from a bearing interior A side end portion of the cylindrical portion 4a.

The seal member 5 is made up of an elastic member such as a synthetic rubber (for example, acrylonitrile butadiene (NBR), acrylic rubber (ACM), fluororubber) and is fixed to the core metal 4 through bonding by vulcanization, baking or the like. This seal member 5 has a main body portion 7, a main lip 8, a sub-lip 9, a side lip 10 and an auxiliary lip 11.

The main body portion 7 is made up of an exterior side cover portion 7a which covers an exterior side B area of the core metal 4, an inner circumferential portion 7b which covers an inner circumferential side area of the annular plate portion 4b and a bearing interior side cover portion 7c which covers part of a bearing interior A side area of the annular plate portion 4b. The main lip 8 extends from the inner circumferential portion 7b of the main body portion 7 towards the inner member side 20 and the exterior side B, and a circumferential groove 8a is formed on an outer circumferential surface thereof. Further, a spring ring 6 referred to as a so-called garter spring is mounted in this circumferential groove 8, so as to fasten the main lip 8 radially inwards. The sub-lip 9 extends from the inner circumferential portion 7b of the main body portion 7 towards the inner member 20 side and the bearing interior A side, and the side slip 10 extends radially obliquely outwards in a skirt-like fashion from an inner circumferential side of the exterior side cover portion 7a of the main body portion 7 towards the exterior side B.

When the main lip 8, the sub-lip 9 and the side lip 10 are assembled on to the slinger 2, a distal end of the main lip 8 is oriented towards the exterior side B and a distal end of the sub-lip 9 is oriented towards the bearing interior A side so that the distal ends thereof are each brought into sliding contact with an outer circumferential surface of the cylindrical portion 2a of the slinger 2, whereby a lubricant residing in the bearing interior A is prevented from leaking to the exterior side B. Further, a distal end of the side lip 10 is oriented towards an outer circumferential side so as to be brought into sliding contact with an inner surface of the annular plate portion 2b of the slinger 2, whereby foreign matters such as muddy water is prevented from intruding into the bearing interior A from the exterior side B.

Here, the slinger 2 is disposed in such a manner as to provide spaces S1, S2 between an end face 2b1 of the annular plate portion 2b and the outer member 21 and an end face 4a1 of the core metal 4 and the inner surface 2b2 of the annular plate portion 2b, respectively, and the auxiliary lip 11 is formed in such a manner as to close the space S2 defined between the annular plate portion 2b of the slinger 2 and the cylindrical portion 4a of the core metal 4. Specifically, the auxiliary lip 11 is formed into a fishing hook-like shape from the exterior side end face 4a1 of the core metal 4 as the seal member 5 of the seal main body 3, and a curved portion 11a thereof contacts an inner surface 2b2 of the annular plate portion 2b of the slinger 2. By the auxiliary lip 11 being provided integrally with the seal member 5 of the seal main body 3, the auxiliary lip 11 can be provided more easily than being provided on the slinger 2. To describe this in detail, since the seal main body 3 has already had the seal member 5, when the auxiliary lip 11 is formed on the seal main body 5, the auxiliary lip 11 only has to be provided integrally on the seal member 5. In contrast, when the auxiliary lip 11 is provided on the slinger 2, an elastic member needs to be provided only for the purpose of providing the auxiliary lip 11 thereon. Because of this, the auxiliary lip 11 can be formed with smaller numbers of components and manufacturing steps than when providing the auxiliary lip 11 on the slinger 2. Further, since the space S1 defined between the end face 2b1 of the annular plate portion 2b and the outer member 21 has the labyrinth effect, foreign matters are made difficult to intrude from the exterior side B, and by closing the space S2 which lies further inwards than the space S1 by the auxiliary lip 11, the intrusion of foreign matters into the interior of the sealing device 1 can be prevented. A distal end of the auxiliary lip 11 is oriented outwards (in a direction towards the outer member 21), which provides a construction which makes more difficult the intrusion of muddy water or the like.

Further, the cylindrical portion 2a of the slinger 2 has an extension 2a1 which extends further inwards towards the bearing interior A side than the seal main body 3, specifically, the annular plate portion 4b of the core metal 4, and a cylindrical member 12 is fixed to an outer circumferential surface of the extension 2a1 for preventing the separation of the slinger 2 and the seal main body 3 from each other. In this sealing device 1, since, by the auxiliary lip 11 and the side lip 10 being brought into contact with the inner surface 2b2 of the annular plate portion 2b of the slinger 2, a force is applied to the annular plate portion 2b of the slinger from both the side lip 10 and the auxiliary lip 11, the seal main body 3 and the slinger 2 are made easy to be separated from each other. However, by the cylindrical member 12 being fixed to the outer circumferential surface of the extension 2a1 which is provided on the bearing interior A side of the cylindrical portion 2a of the slinger 2, the separation of the slinger 2 and the seal main body 3 can be prevented. Once the slinger 2 and the seal main body 3 are separated from each other, they cannot be reused any more, and the sealing device in which such a separation has occurred has to be disposed of. Because of this, by so attaching the cylindrical member 12, the numbers of sealing devices that have to be so disposed of can be reduced. Further, the cylindrical member 12 can be formed of an elastic member such as a rubber or be formed of a metal. The cylindrical member 12 may be annular or may be provided one or more in a circumferential direction.

In the sealing device 1 that is configured in the way described above, by closing the space S2 defined between the annular plate portion 2b of the slinger 2 and the cylindrical portion 4a of the core metal 4 by the lip, the intrusion of foreign matters such as muddy water into the interior of the sealing device 1 from the exterior side B can be prevented. By this, the intrusion of foreign matters into the bearing interior A can be prevented.

Figure 2:
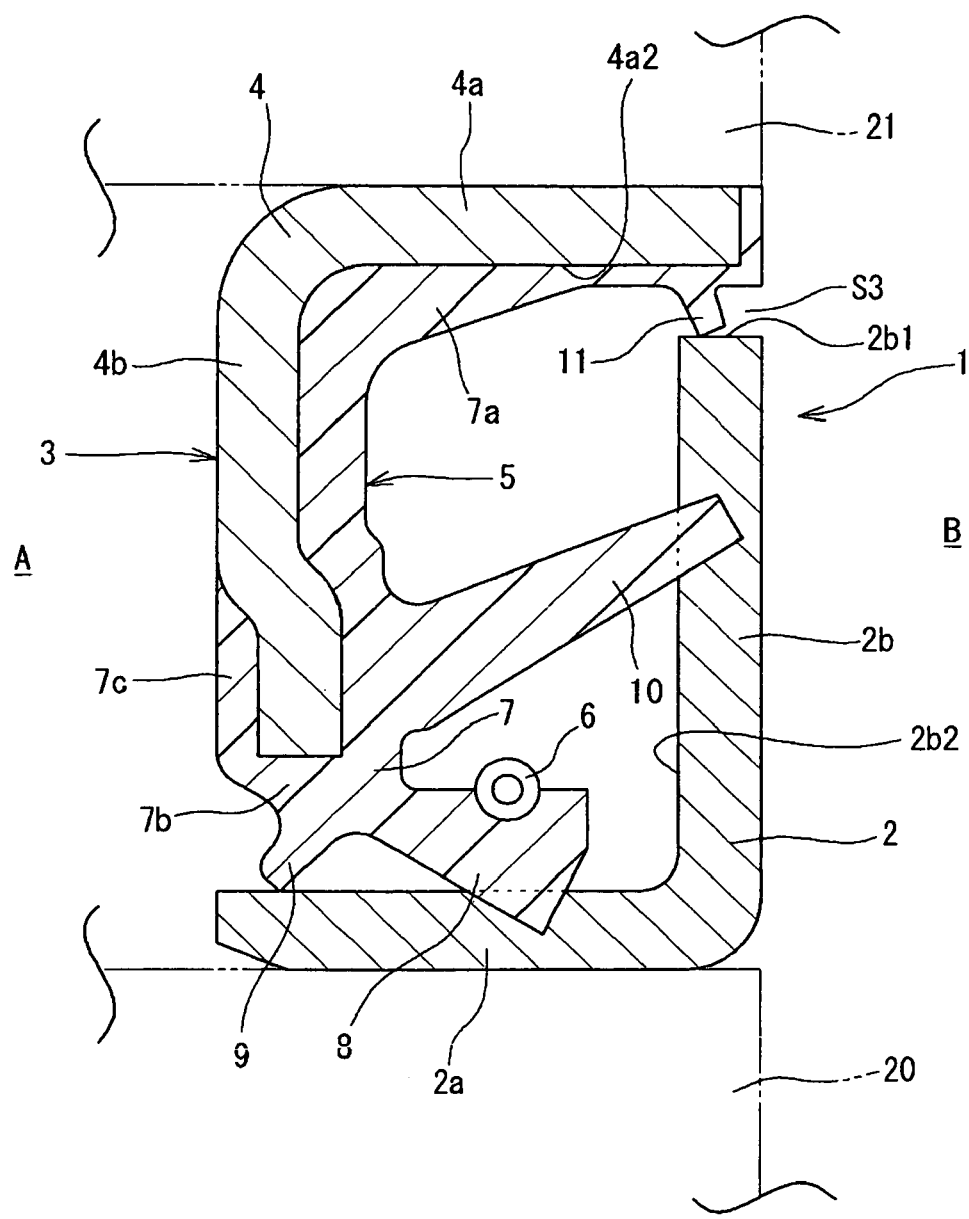
FIG. 2 is a explanatory sectional view showing a sealing device according to another embodiment of the invention.
Figure 3:
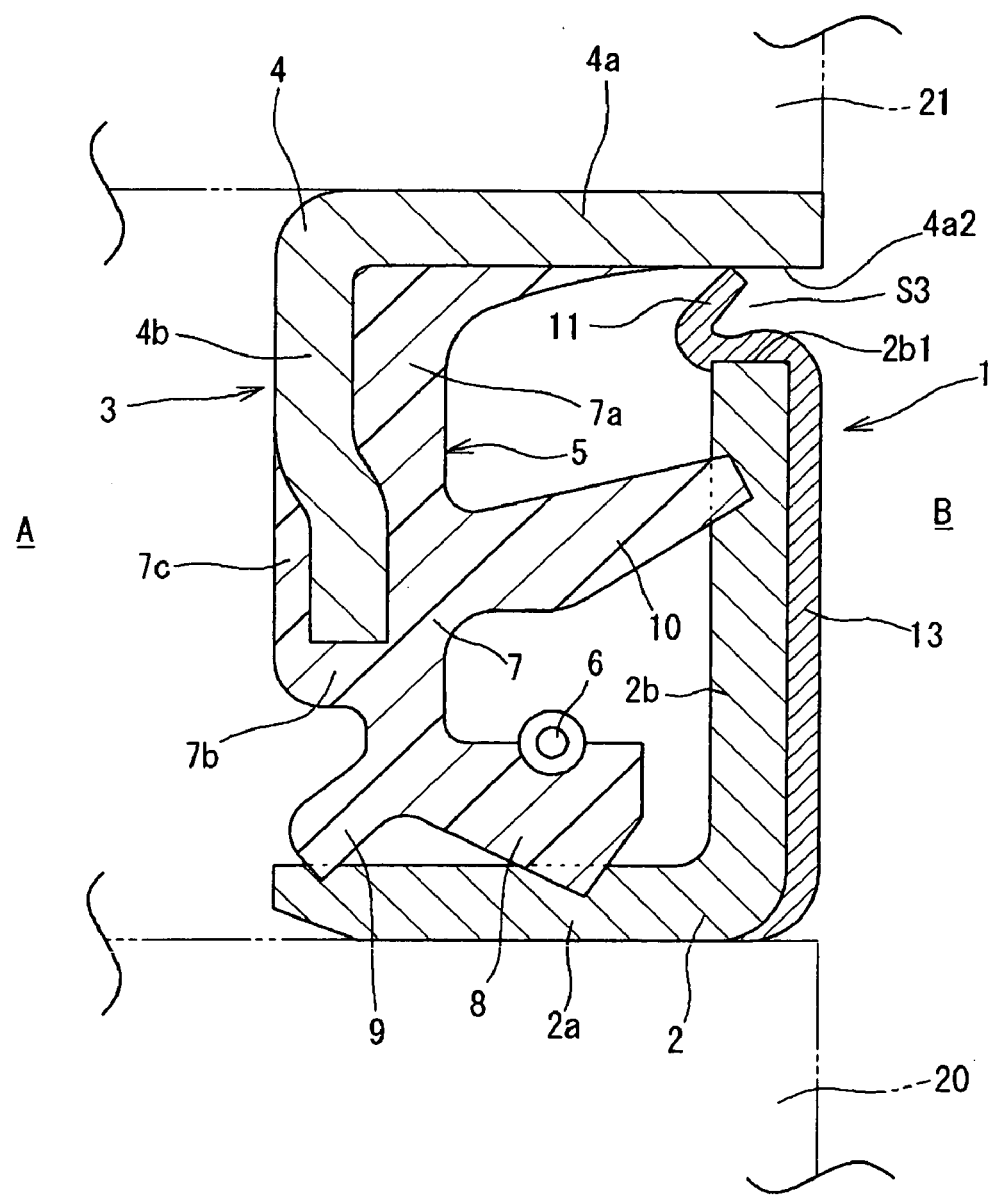
FIG. 3 is a explanatory sectional view showing a sealing device according to a further embodiment of the invention.
Figure 4:
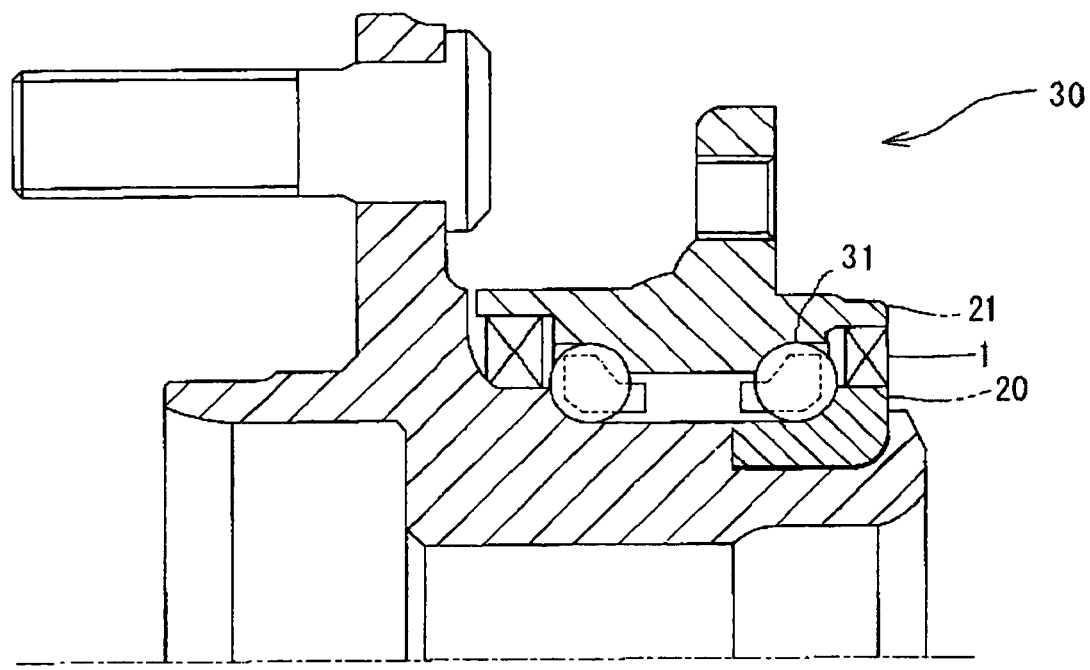
FIG. 4 is a drawing of a rolling bearing apparatus which employs the sealing device of the invention.

Further, in this embodiment, while the slinger 2 is described as being press fitted on the inner member 20 and the seal main body 3 is described as being press fitted in the outer member 21, on the contrary to this, the invention can be carried out by press fitting the seal main body 3 on the inner member 20 and press fitting the slinger 2 in the outer member 21. In the embodiment described above, while the auxiliary lip 11 closes the space S2 between the exterior side end face 4a1 of the core metal 4 and the inner surface 2b2 of the annular plate portion 2b of the slinger 2, the auxiliary lip 11 may be provided in any place, provided that it can prevent the intrusion of foreign matters such as muddy water by closing the space between the core metal 4 and the slinger 2. Thus, for example, as is shown in FIG. 2, the auxiliary lip 11 may be provided integrally on the seal member 5 of the seal main body 3 in such a manner as to close a space S3 between an inner circumferential surface 4a of the cylindrical portion 4a of the core metal 4 and the end face 2b1 of the annular plate portion 2b of the slinger 2. As this occurs, the auxiliary lip 11 is oriented towards the exterior side B and is in contact with the end face 2b1 of the annular plate portion 2b of the slinger with almost no load applied thereto (zero touch). By this, an increase in running torque can be prevented. Since the auxiliary lip 11 is oriented outwards, the intrusion of foreign matters such as muddy water is made difficult, and even though foreign matters collide with the auxiliary lip 11, the foreign matters are propelled back to the exterior side B. Further, the invention is not limited to the configuration in which the auxiliary lip 11 is formed integrally on the seal member 5 of the seal main body 3, and hence, as is shown in FIG. 3, the auxiliary lip 11 can be provided on the slinger 2. As this occurs, an elastic member 13 is placed to be attached to the exterior side B of the annular plate portion 2b of the slinger 2, so that a fishing hook-like auxiliary lip 11 only has to be formed with a distal end oriented towards the exterior side B to thereby be brought into sliding contact with the inner circumferential surface 4a1 of the cylindrical portion 4a of the core metal 4 in such a manner as to close the space S3 between the inner circumferential surface 4a of the cylindrical metal 4 and the end face 2b1 of the annular plate portion 2b of the slinger 2.

Further, in FIGS. 2 and 3, as in FIG. 1, a cylindrical portion 2a may be provided by providing an extension 2a1 by extending the cylindrical portion 2a of the slinger. On all the auxiliary lips in all the three embodiments that have been described above, a distal end portion thereof is oriented axially outwards. By this, muddy water from the exterior can be discharged effectively.

In particular, in FIG. 3, the elastic element is placed to be attached to the axial side surface of the slinger 2, the waterproof effect is enhanced.

The invention claimed is:

1. A sealing device adapted to be mounted in an annular space defined between an inner member and an outer member which rotate relative to each other, the sealing device comprising:
    a slinger which includes a cylindrical portion press fitted on or in one of the inner member and the outer member and an annular plate portion extending in a radial direction from the cylindrical portion;
    a seal main body which includes a core metal having a cylindrical portion press fitted in or on the other of the inner member and the outer member and an annular plate portion which extends in the radial direction from the cylindrical portion, and which includes a seal member fixed to the core metal; and
    a cylindrical member for preventing the slinger from separating from the seal main body, the cylindrical member being disposed on an outer circumferential surface of the cylindrical portion of the slinger in a position lying further inwards towards an interior of a bearing than the seal main body, the cylindrical member comprising a member other than the slinger,
    wherein a lip which closes a space between the annular plate portion of the slinger and the cylindrical portion of the core metal is provided on the seal main body,
    wherein the annular plate portion of the slinger comprises an inner surface which is opposed to the annular plate portion of the core metal, and
    wherein the lip slidably contacts the inner surface of the annular plate portion of the slinger.

2. The sealing device according to claim 1, wherein the lip is provided integrally on the seal member of the seal main body.

3. The sealing device according to claim 2, wherein the seal member of the seal main body includes the lip and a side lip which slidably contact the inner surface of the annular plate portion of the slinger.

4. The sealing device according to claim 1, wherein the cylindrical member comprises an elastic material.

5. The sealing device according to claim 1, wherein the cylindrical member comprises rubber.

6. The sealing device according to claim 1, wherein the cylindrical member comprises metal.

7. The sealing device according to claim 1, wherein the seal main body further comprises a coil spring disposed on the seal member so as to press a portion of the seal member towards the cylindrical portion of the slinger.

8. The sealing device according to claim 1, wherein a distal end of the annular plate portion of the slinger faces in a direction perpendicular to an end face of the cylindrical portion of the stinger.

9. The sealing device according to claim 1, wherein the cylindrical portion of the slinger is press fitted on or in the inner member and the cylindrical portion of the core metal is press fitted in or on the outer member.

10. A rolling bearing apparatus comprising:
    an inner ring and an outer ring which rotate relative to each other via rolling elements; and
    a sealing device adapted to be disposed in an annular space defined between the inner ring and the outer ring,
    wherein the sealing device comprises:
        a slinger which includes a cylindrical portion press fitted on or in one of the inner ring and the outer ring and an annular plate portion extending in a radial direction from the cylindrical portion;
        a seal main body which includes a core metal having a cylindrical portion press fitted in or on the other of the inner ring and the outer ring and an annular plate portion extending in the radial direction from the cylindrical portion, and which includes a seal member fixed to the core metal; and a cylindrical member for preventing the slinger from separating from the seal main body, the cylindrical member being disposed on an outer circumferential surface of the cylindrical portion of the slinger in a position lying further inwards towards an interior of the bearing than the seal main body, the cylindrical member comprising a member other than the slinger, and wherein a lip for closing a space between the annular plate portion of the slinger and the cylindrical portion of the core metal is provided on the seal main body, wherein the annular plate portion of the slinger comprises an inner surface which is posed to the annular plate portion of the core metal, and wherein the lip slidably contacts the inner surface of the annular plate portion of the slinger.

11. The rolling bearing apparatus according to claim 10, wherein the lip for closing a space between the annular plate portion of the slinger and the cylindrical portion of the core metal is curved such that the lip extends from an exterior side end face of the core metal and includes a curved portion which contacts the inner surface of the annular plate portion of the slinger.

\* \* \* \* \*